United States Patent [19]
Freeman

[11] Patent Number: 5,097,937
[45] Date of Patent: Mar. 24, 1992

[54] APPARATUS AND METHOD FOR RAISING CAN HANDLES

[75] Inventor: Michael A. Freeman, Clacton-on-Sea, England

[73] Assignee: CCL Label, Inc., Grand Rapids, Mich.

[21] Appl. No.: 608,456

[22] Filed: Nov. 2, 1990

[30] Foreign Application Priority Data

Nov. 4, 1989 [GB] United Kingdom ................ 8924959

[51] Int. Cl.⁵ .............................................. B65G 47/24
[52] U.S. Cl. .................................... 198/394; 198/400; 198/416
[58] Field of Search ............... 198/394, 395, 399, 400, 198/416

[56] References Cited

U.S. PATENT DOCUMENTS

| | | | |
|---|---|---|---|
| 2,623,274 | 12/1952 | Henchert | 140/93 B |
| 3,241,578 | 3/1966 | Heisler | 140/93 BX |
| 3,389,778 | 6/1968 | Kovacs et al. | 198/394 |
| 3,439,792 | 4/1969 | Frank et al. | 198/394 X |
| 3,462,823 | 8/1969 | Heisler | 198/394 X |
| 3,848,394 | 11/1974 | Heisler | 198/394 X |
| 4,383,601 | 5/1983 | Heisler | 198/394 |
| 4,454,895 | 6/1984 | Heisler | 140/93 R |
| 4,653,628 | 3/1987 | Claypool et al. | 198/394 X |

Primary Examiner—Glenn D. Dayoan
Attorney, Agent, or Firm—Warner, Norcross & Judd

[57] ABSTRACT

Cans, such as paint cans, provided with pivotable handles are handled by apparatus so that the handles are moved to an erected position. The apparatus comprises a sleeve structure through which each can is passed, and as the can passes through the sleeve structure, cam tracks on the sleeve structure engage the handle and raise it to the erected position.

12 Claims, 2 Drawing Sheets

APPARATUS AND METHOD FOR RAISING CAN HANDLES

This invention relates to handling apparatus for the handling of articles which a multiplicity have to be processed, and which in being processed have to be delivered in sequence to a processing station. The invention also concerns a method of handling such articles.

Typically, the invention is concerned with the handling of circular containers or "cans" for holding products and which are provided with pivotable handles whereby the cans may be carried. Particular examples of the articles in question are paint cans, and the larger the cans, the greater the need for providing same with a handle. These cans may be in sizes from one half of a liter upwards, and certainly cans over the size of one liter would almost without exception be provided with a handle.

The handle is a simple component being essentially of semi-circular shape and of relatively small cross-section having regard to its length, and the ends of the handle are pivotally attached to diametrically opposite locations at the top edge of the can. When the handle is in use it is held by the hand so that the can will hang from the ends of the handle, but when the handle is not in use it simply falls to a position in which it is downwardly inclined from its pivot points and rests on the side of the can.

SUMMARY OF THE INVENTION

The present invention is concerned with the processing of cans having handles in order to raise the handle from its rest position to enable further processing to be carried out on the wall of the can, such further processing comprising for example the application of a label or the application of printing. Clearly, it will be necessary to move the handle away from the wall in circumstances where the can is to be so processed especially where cans in large numbers are to be processed in sequence by automatic handling apparatus.

In accordance with the present invention, the apparatus comprises a sleeve structure and the can is moved into the sleeve structure, said sleeve structure having at least one handle engaging cam track which lifts the handle to a raised position as the can moves into the sleeve structure.

Preferably, the sleeve structure defines four cam tracks arranged in pairs, and each pair extending oppositely from a ridge, the ridges being located at diametrically opposite locations. Adjacent handle lifting cam tracks of the respective pairs may lead on the one hand to a slot for receiving the raised handle, and a recess in which the other end of the raised handle sits so that as the can is pushed into the apparatus it will reach a position in which the handle will be raised to the position the handle normally occupies when the can is being carried, the sleeve structure being cut away under the said slot so that the can with the handle in the raised position can be moved laterally out of the sleeve and into a further apparatus utilised for the processing of the can. The further apparatus may comprise a guide having a slot therein into which the raised handle passes so that it will be retained in the raised position enabling the can and in particular the can wall to be further processed involving, for example, the application of a wrap round pressure sensitive adhesive label to the can wall.

In this connection the further processing apparatus guide receiving the handle may have a portion which is rotatable to enable the can to be rotated as the label is applied, for example in the method as described in International Patent Application No. WO 90/05089.

The can may be inserted into the sleeve by a pushing means which may simply be a rod, and said pushing means will be such as not to foul with the handle when it is retracted after inserting the can into the sleeve. In conjunction with the sleeve structure there may be a brushing or wiping device comprising an aperture through which the can is passed, and which is surrounded by a flexible membrane or brushes or the like which has the effect of wiping the wall of the can as it is pushed therethrough, and of pre-erecting the handle prior to its insertion into the sleeve.

Cans preferably are fed one by one and in sequence into and through the sleeve and the pre-erection device, and, in order to ensure that no can is inserted into the sleeve in the unique position where the handle ends may coincide exactly with the ridges of the sleeve, which could cause malfunctioning of the apparatus, the cans as they are delivered to the apparatus may be pre-set by a pre-setting means which senses the position of the handle in relation to the position of the ridges, and imparts spin to the can to reposition same if the handle ends are in danger of being in the critical position.

The pre-spin apparatus may comprise a rotating brush roller set to engage only the handle ends of the cans as the cans pass the spin roller, if such ends are in a position to interfere with the spin roller, which corresponds to the said critical position.

The spin roller prepositions any undesirably positioned can so that the handle ends will in the subsequent insertion of the can into the sleeve ensure that the respective handle ends lie in a diametrical position which is at a substantial angle to the diametrical position containing the said ridges when the can is pushed into the sleeve.

The sleeve may be a tubular structure of any suitable material, duly cut away to define said cam tracks slots and the like, and appropriately mounted on the machine to receive cans which are pushed from above into the top end of the sleeve.

The apparatus and method according to the invention ensures that cans with handles may be processed repeatedly, reliably and at high speed, facilitating the further processing e.g. labelling of same.

DESCRIPTION OF THE PREFERRED EMBODIMENTS

Figure 1:
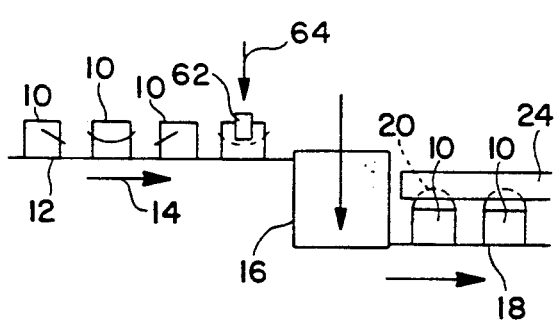
FIG. 1 is a diagram showing the flow path of cans which arrive on a conveyor with their handles randomly orientated, and depart after passing through apparatus according to the embodiment of the invention with their handles in raised condition.

Referring to the drawings, and firstly to FIG. 1, paint cans 10 are supplied in sequence on a conveyor 12 and move in the direction indicated by arrow 14. The cans pass through a handle erecting apparatus 16 according to an embodiment of the invention, and then leave on a conveyor 18 with the handles in raised position. The cans 10 move through the apparatus 16 in turn and in so doing are moved downwardly, the conveyor 18 being at a lower level than the conveyor 12. When the cans are positioned on conveyor 18, they are moved to a further station for processing, for example for the application of a label thereto.

The present invention is concerned with ensuring that the can handles are raised in the correct and predictable manner so as to be moved away on the conveyor 18 because the erected handles 20 are engaged and held in position by a slotted guide 24, the handles 20 being engaged in the guide slot.

Figure 2:
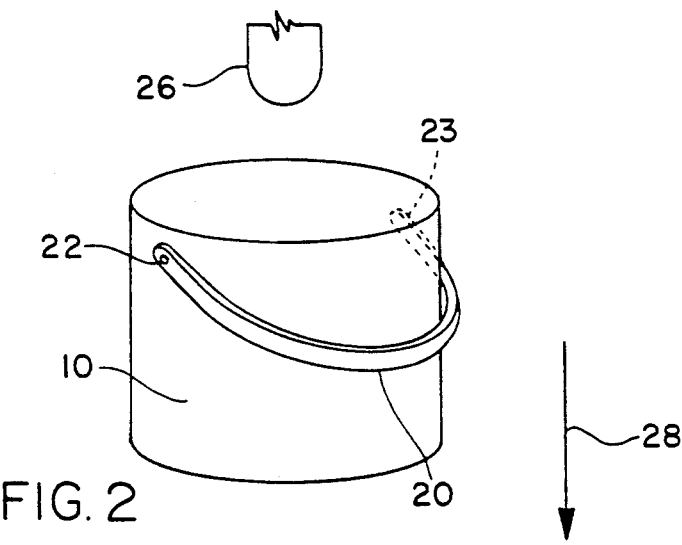
FIG. 2 is an exploded perspective view to illustrate the operation of the handle raising apparatus of FIG. 1.

If reference is made to FIG. 2, it will be understood how the can handles 20 are erected to the correct position, and the can is orientated correctly for receipt of the handle 20 in the slotted guide 24.

As shown in FIG. 2, the can 10 is cylindrical, and the handle 20 is an elongated strip which is of semi-circular configuration, and is pivotally mounted at 22 and 23 representing pivots which are diametrically opposite and are located adjacent the top edge of the can 10.

In order to erect the handle 20 to the raised position, the can 10 is pushed through the apparatus 16 by a pusher 26 which moves downwardly and engages the top of the can 10 and moves same as indicated by arrow 28 through a guide plate 30 having an aperture 32 therein which is bounded by a membrane or brush bristles 34 which wipes or wipe the outer wall of the can 10 as it passes through the aperture 32 in order to effect a pre-raising of the handle 20. With continued downward movement, the can 10 moves into a sleeve structure 36 whose design is such as to ensure that the handle 20 is raised and also that the can 10 is rotated into the correct predetermined orientation in relation to the guide 24. To this end the sleeve 36 is cut to provide pairs of cam lift tracks 38, 40 and 42, 44 which extend symmetrically from opposite sides of two ridge points 46, 48 which are diametrically opposite. The cam tracks 40 and 44 lead to a slot 50 which opens into a lower edge 52 of the sleeve, whilst the cam tracks 38 and 42 lead to a recess 54 having a blind end 56. The sleeve 36 is extended downwardly as indicated by reference 58 so as to provide a semi-cylindrical skirt portion of which the vertical edges are coincident axially with the ridges 46 and 48. The sleeve 36 is dimensioned so that a can 10 can neatly fit therein as indicated by chain dotted lines in FIG. 2.

The operation of the specially constructed sleeve will be readily understood. As the can 10 passes into the sleeve 36 as long as the pivots 22 and 23 of the handle are to opposite sides of a line connecting ridges 46 and 48 so the ends of the handle 20 will be engaged by cam tracks 38 and 44 or 40 and 42 and these tracks will cause the can 10 to spin about its axis and to erect a handle 20 until the can reaches the position shown in chain dotted lines in FIG. 1, in which one end of the handle 20 is located in the recess 54, and the other end is located in the slot 50 and in this position the top of the can 10 is lower than the sleeve lower edge 52.

Figure 3:
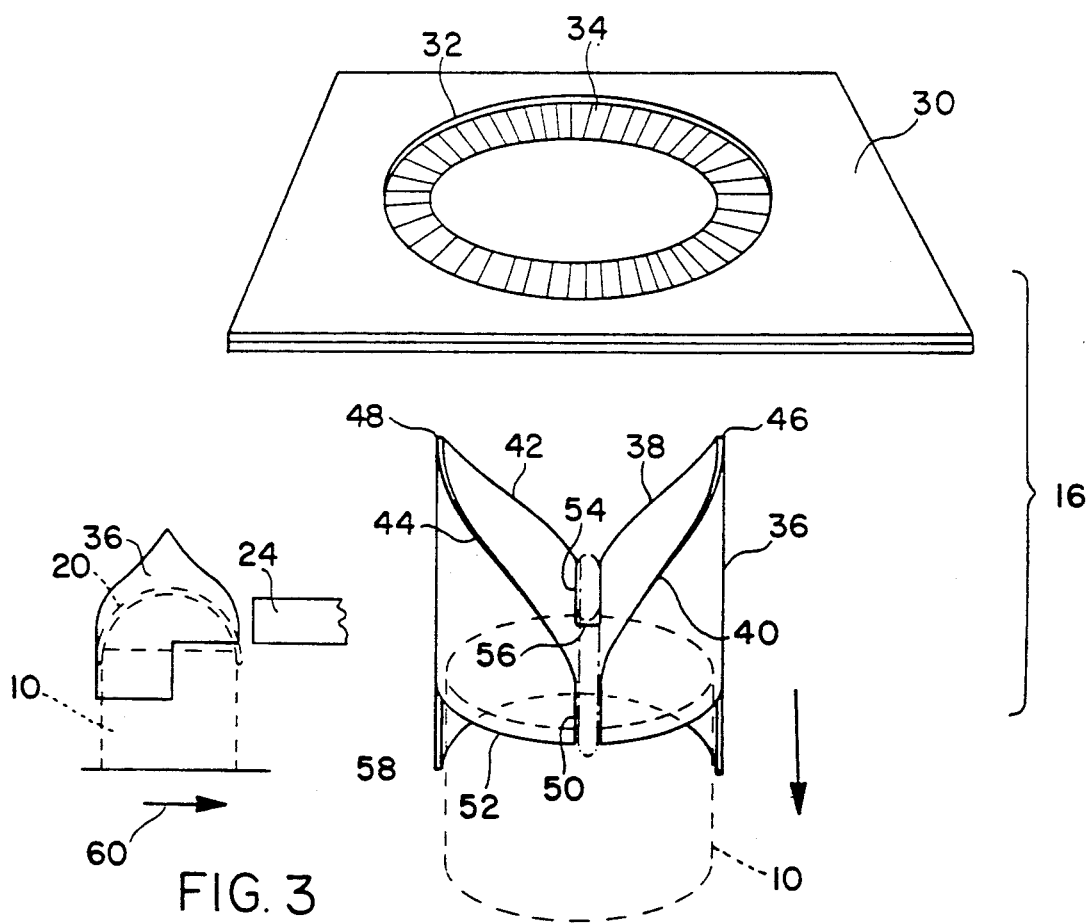
FIG. 3 is a side view of a portion of the apparatus shown in FIG. 2.

This position is shown in FIG. 3, and it can be seen therefore that the can 10 can now be moved by a suitable conveying means as indicated by the arrow 60 so that the handle 20 can enter the slot in the guide 24 as described above.

The sleeve 36 may be constructed of any suitable material and may be appropriately mounted in correct position for receiving the can 10.

It will be appreciated that when the apparatus of FIG. 1 is operational, the cans 10 pass through the apparatus 16 in rapid sequence.

The pusher 26 should be such form so as not to catch on the handle 20 as the pusher 26 is retracted. Obviously the pusher 26 will have to operate on a reciprocal motion.

In erecting the can handles in the manner described, it is important that cans should not be presented to the sleeve 36 with the handle ends in alignment with ridges 44 and 46 because the ends could lock against the ridges or alternatively if the can tilts such that pivots 22 and 24 lie to the same side of a diametrical line joining the ridges 44, then the apparatus will not function as described. To this end therefore a means is provided for ensuring that the cans as they arrive at the apparatus 60 will be in a disposition to prevent the above deleterious events from happening.

Figure 4:
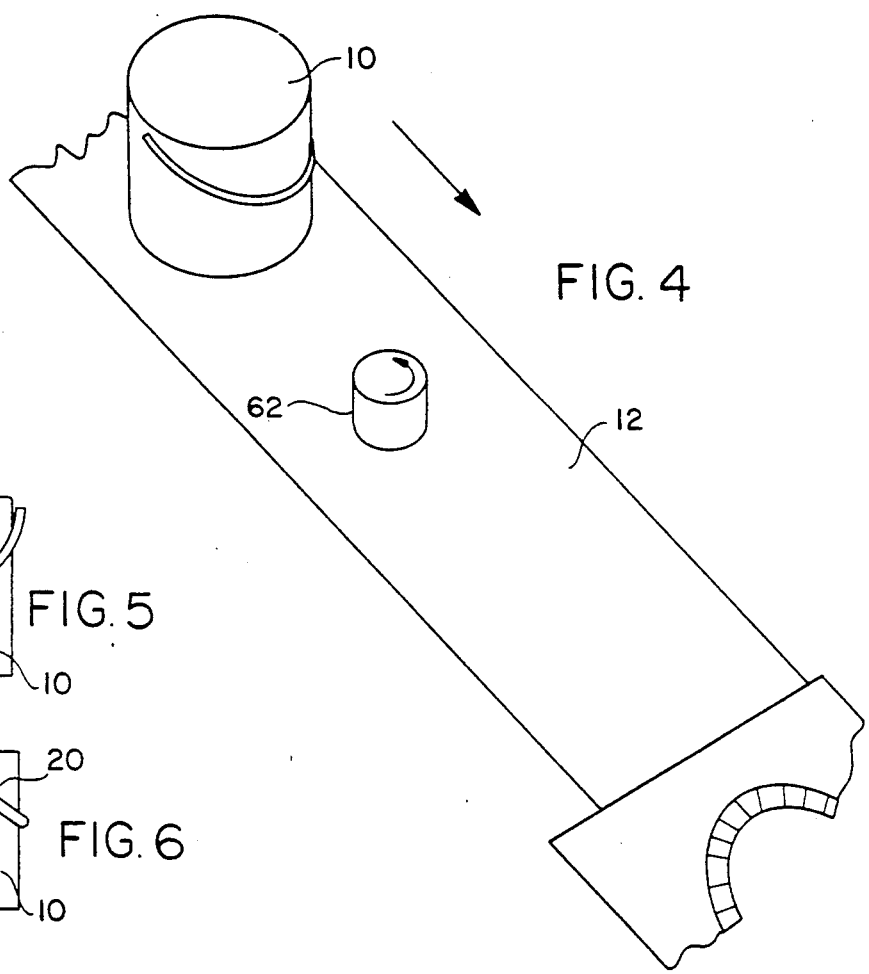
FIG. 4 is a perspective view to illustrate how the cans are prepositioned before being passed through the apparatus of FIG. 2.

The means which is provided is in fact a spin roller 62 whose position is best seen in FIG. 1. The spin roller is located at location 64 and is mounted for rotation on a fixed axis (not shown). The spin roller 62 is shown in FIG. 4 and also shown is a can 10 on the conveyor 12, which can is approaching the spin roller 62.

Figure 5:
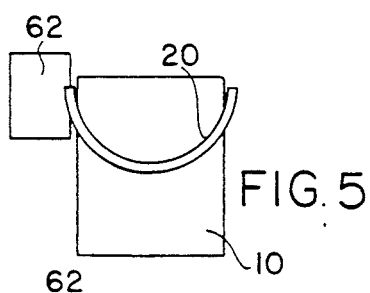
FIGS. 5, 6, 7 and 8 are views to illustrate different possible orientations of cans.

FIGS. 5-8 show the spin roller 62 and respectively a can 10 disposed in relatively different orientations to explain the operation of the spin roller 62. Roller 62 may be for example a bristle roller or a roller of flexible material which can deform in order not to damage the handles of the cans, because it is only the handles which are engaged by the roller 62. The roller 62 in side view is located so as to lie adjacent the top edge of each can as it passes the roller. If the can is positioned in an undesirable orientation, roller 62 will engage the handle 20 of the can as shown in FIG. 5, and will spin the can through part of a revolution until the handle lies in a disposition ensuring that subsequently the pivots 22 and 24 will lie to opposite sides of the line connecting the ridges 46 and 48.

Figure 6:
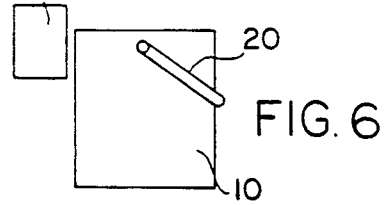

FIG. 6 shows the situation where the handle is to the side of the can opposite the roller 62. Roller 62 does not engage the can 10 which can therefore pass the orientation station unimpeded.

Figure 7:
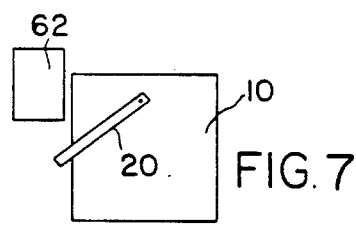

Even with the arrangement in FIG. 7, where the handle lies to the side of the can adjacent the roller 62, the can can pass unimpeded because the handle pivots are in suitable position for presentation to the apparatus 16.

Figure 8:
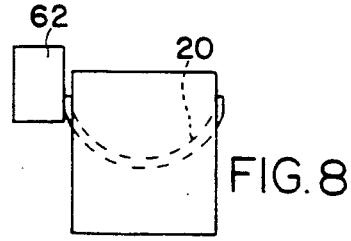

In FIG. 8 the handle 20 is in the opposite position from that shown in FIG. 1, and therefore the end will be engaged by the roller 62 as shown which will spin the can until it reaches a FIG. 6 or FIG. 7 position enabling it to pass the roller 62 and be presented correctly for the apparatus 16.

The arrangement described provides a means for the effective handling of cans whose handles have to be raised to an erected position, enabling the further processing of the cans, and high throughput speeds can be achieved.

I claim:

1. Apparatus for the positioning of a can with a pivotable handle so that the handle is raised to an erected position, comprising:
   a) a sleeve structure for receiving the can therethrough in a first direction, said sleeve structure including at least one handle-engaging cam track for engaging the can handle as the can passes through said sleeve structure to orient the handle in the first direction; and
   b) conveying means for delivering each can to the sleeve structure whereby the said cam track pivots the handle to the erected position as the can passes through said sleeve structure.

2. Apparatus according to claim 1, including insertion means arranged to push cans into and through the sleeve structure.

3. Apparatus according to claim 2, including a wiping means arranged between the sleeve structure and the insertion means, said wiping means adapted to wipe the can handle to the erected position before it moves into the sleeve structure.

4. Apparatus according to claim 3, wherein the wiping means comprises a ring having brush means at its inner edge.

5. Apparatus for the positioning of a can with a pivotable handle so that the handle is raised to an erected position, comprising:
   a) a sleeve structure,
   b) insertion means for moving the can through said sleeve structure,
   c) four handle engaging cam tracks arranged on said sleeve structure in pairs, and
   d) two diametrically opposite ridges on said sleeve structure, one pair of cam tracks extending from each ridge,
whereby said cam tracks pivot the handle to the erected position as the can passes through said sleeve structure.

6. Apparatus according to claim 5, wherein two of the cam tracks at one side of the ridges lead to a slot in the sleeve structure through which the erected handle can pass, and the other two cam tracks at the other side of the ridges lead to a recess in which the other end of the handle can sit.

7. Apparatus according to claim 6, wherein the sleeve structure is cut away at one end to allow the can with the erected handle to be removed from the sleeve in a direction laterally of the sleeve structure axis.

8. Apparatus according to claim 7, including a guide for receiving the erected handle to keep it erected as the can is moved out of the sleeve structure.

9. Apparatus according to claim 1 or 5, including a pre-setting means for engaging the can as it travels on the conveying means to spin it to a position suitable for presentation to the sleeve structure.

10. Apparatus according to claim 9, wherein the pre-setting means comprises a spin roller adapted to engage the can handle and spin the can into a desired position.

11. Apparatus for handling cans provided with pivotable handles to erect the can handles, said cans comprising bodies having tops and bottoms, said handles being pivotally attached by their ends to opposite sides of the cans at the tops thereof, said apparatus comprising,
   a) first conveying means for moving the cans one by one in a first direction to a displacement station;
   b) a handle erecting sleeve structure at said displacement station, said sleeve structure disposed with its axis transverse to said first direction;
   c) insertion means for pushing the cans one by one through the sleeve structure bottom first;
   d) cam track means on the sleeve structure for engaging the can handle as each can passes through the sleeve structure to erect the handle to a raised position; and
   e) slot means in the sleeve structure for enabling the can to be displaced laterally of the sleeve structure with the erected handle moving through the slot means.

12. A method of erecting a can handle comprising:
conveying the can through a sleeve structure which is provided with a handle-engaging cam track means; and
causing the cam track means to engage the handle to erect same as the can passes through the sleeve structure.

* * * * *